United States Patent Office 2,844,139
Patented July 22, 1958

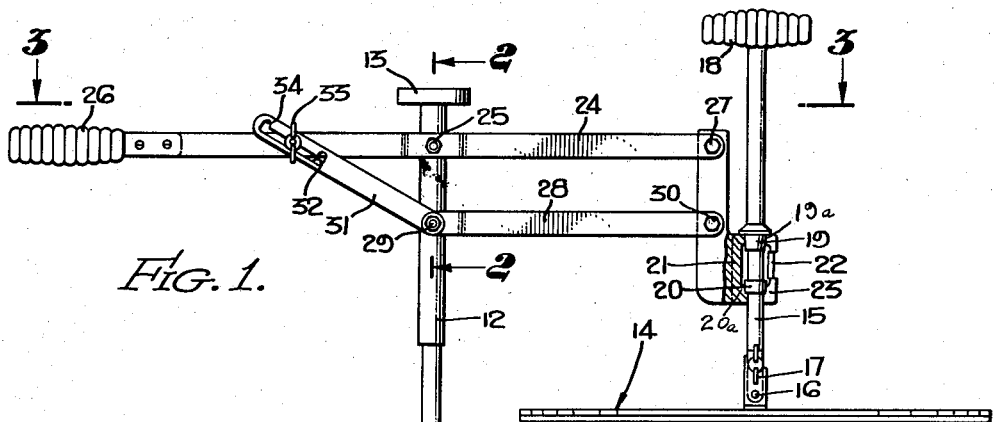
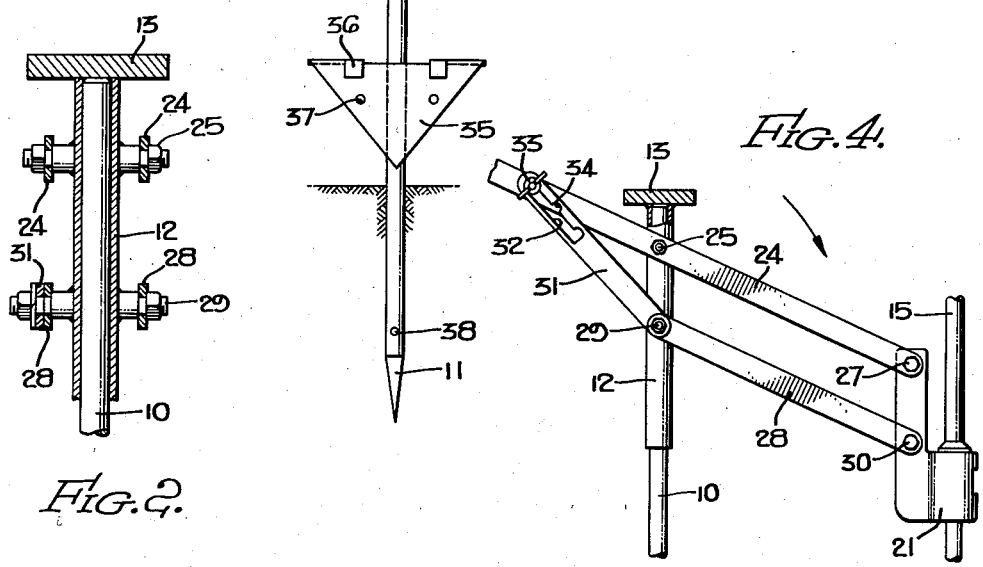
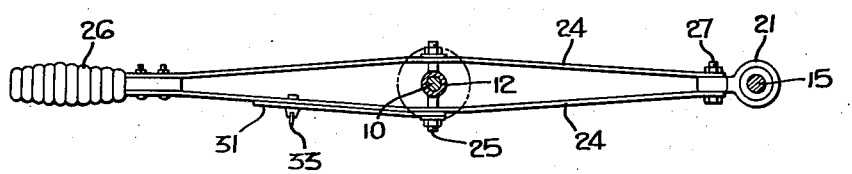
DON D. LUCAS,
INVENTOR.
BY Hazard & Miller
ATTORNEYS

2,844,139

PORTABLE BARBECUE

Don D. Lucas, Bakersfield, Calif.

Application September 1, 1955, Serial No. 532,015

5 Claims. (Cl. 126—30)

This invention relates to improvements in portable barbecues.

An object of the invention is to provide an improved portable barbecue which can be suitably mounted adjacent a barbecue fire and which will support a grill over the fire, the construction being so arranged that the grill may be raised or lowered with respect to the fire or swung laterally either onto or off of the fire. In all positions of adjustment the grill may be rigidly maintained in a horizontal position and rotated in a horizontal plane so that articles placed thereon, even if positioned in an unbalancing relationship, will nevertheless be maintained on a sturdy horizontal support afforded by the grill.

With the foregoing and other objects in view, which will be made manifest in the following detailed description and specifically pointed out in the appended claims, reference is had to the accompanying drawings for an illustrative embodiment of the invention, wherein:

Figure 1 is a view in side elevation of the improved barbecue embodying the present invention;

Fig. 2 is a vertical section taken substantially upon the line 2—2 upon Fig. 1 in the direction indicated;

Fig. 3 is a horizontal section taken substantially upon the line 3—3 upon Fig. 1; and Fig. 4 is a partial view in side elevation illustrating the barbecue as having been adjusted from the position shown in Fig. 1.

Referring to the accompanying drawing wherein similar reference characters designate similar parts throughout, the improved barbecue consists of an upright support or stake 10 preferably having a pointed lower end 11 which will facilitate its being driven into the ground. At the upper end of the support or stake 10 there is a head formed of a sleeve 12 that telescopes over the top of the stake or which is equipped with a cap 13. This cap may be struck with a hammer or similar implement to force the stake into the ground. The sleeve and cap which form the head are rotatable on the upper end of the support 10 so that the grill 14 which is mounted thereon may be swung about the axis of the stake 10 onto or off of a barbecue fire which may be built adjacent the stake.

The grill 14 is suspended by means of a vertical rod 15 that is hingedly connected to the grill as at 16 between two upright ears on the grill. A bolt extends through the lower end of the rod 15 and is equipped with a wing nut 17. This bolt is adapted to enter notches in the upper ends of the ears, and when the wing nut is tightened, the rod 15 is held rigidly relatively to the grill in an upright position. On loosening the wing nut 17 the rod 15 can be swung down against the grill to collapse the rod and grill so that they will occupy a minimum amount of space during transportation or storage.

The top of the rod is equipped with a handle 18 by which the rod and grill can be lifted. On the rod there are two spaced enlargements 19 and 20 which are preferably tapered. These enlargements are of such size that they cannot pass downwardly through a socket 21, but seat on complementary upwardly facing upper and lower seats 19a and 20a respectively. However, if the handle 18 is lifted slightly the lower enlargement 20 may be passed through the widest portion 22 in the slot 23 that is formed in the forward side of the socket 21. During such movement the enlargement 19 is lifted clear of the socket and can be passed forwardly over the top of the socket.

When the enlargements are in the position shown in Fig. 1 they fit within conical surfaces formed in the socket so that although the rod 15 can be axially rotated relative to the socket 21 it cannot tip or tilt relatively thereto. When the rod 15 is completely removed from the socket the grill 14 can be transported from place to place by the handle 18, and due to the releasable locking connection formed by the bolt and wing nut 17 danger of the grill tipping is effectively prevented even though it is loaded in an unbalanced manner.

To provide for vertical adjustment of the grill and maintaining it in a horizontal position in all positions of adjustment the head, composed of the sleeve 12 and the cap 13, has a lever 24 pivotally connected to the sleeve 12 as at 25. One end of this lever is equipped with a handle 26 and the other end is pivotally connected to the socket 21 as at 27. One or more links 28 are disposed in parallel relationship to the lever 24. These links are pivotally connected to the sleeve 12 as at 29, and to the socket 21 as at 30. By reason of the parallel relationship and the pivotal connections, the socket and consequently the grill 14 will be maintained in the same relative position in all positions of adjustment, compare Fig. 1 with Fig. 4. To releasably lock the adjusting lever 24 and the links 28 in any adjusted position a slotted bar 31 is pivotally connected to the sleeve 12 at 29. This bar has its slot 32 slidable on a bolt equipped with a wing nut 33 which is mounted on the lever 24. During adjustments of the lever 24 the bolt merely slides in the slot 32 but on tightening the wing nut 33 the bar 31 will maintain or releasably lock the lever 24 in any of its adjusted positions. The top edge of the slot 32 is preferably notched as at 34 to accommodate the bolt in any of its three major or usual positions of adjustmetn. The number of these notches may be increased or decreased as desired.

Adjacent the lower end of the upright support or stake 10 there is secured a triangular section of sheet metal indicated at 35. Lugs on the top edge of this section indicated at 36 are bent downwardly to form downwardly open hooks. These hooks may receive a bar, not shown, that is adapted to be positioned against the top surface of the ground and thus assist in maintaining the support 10 in an upright position even though it may be heavily loaded in an unbalanced manner. These same hooks may also be used to hook the upright support on the side of a metal barrel or other metal container in which the barbecue fire may be built. The triangular section 35 is also preferably perforated as at 37, and the bottom of the stake is equipped with an aperture 38. These perforations and aperture may receive studs or bolts that are mounted on the barrel or other container in which the barbecue fire may be built.

From the above-described construction it will be appreciated that when in use it is possible to turn the head composed of the sleeve 12 and the cap 13, about the axis of the stake 10 to swing the grill 14 onto or off of the barbecue fire. Furthermore, it is possible on loosening the wing nut 33 to raise or lower the grill relatively to the fire. In all positions of adjustment the grill 14 is maintained in a horizontal position. If it is desired to remove the grill and articles supported thereon this is readily accomplished by lifting the rod 15 by the handle 18 a sufficient distance to enable the enlargements 19 and 20 to pass forwardly and out of the socket 21.

When it is desired to reduce the structure to a small, compact form for transportation or shipping purposes, the rod 15 and the grill 14 are removed. The wing nut 17 is loosened and the rod is swung downwardly into a position overlying the grill. The head is removed from the stake and the links and lever are collapsed into a position as close to each other as possible. The stake 10 can be positioned in side by side relationship to the lever. In this manner, the structure can be collapsed into a minimum amount of space during transportation or storage.

Various changes may be made in the details of construction without departing from the spirit and scope of the invention as defined by the appended claims.

I claim:

1. A barbecue comprising an upright support, a lever pivotally mounted upon said support for swinging movement relatively thereto about a horizontal axis, a link pivotally mounted upon the support in parallel relationship to the lever for swinging movement about a parallel axis, a vertically disposed socket pivotally mounted on the outer ends of the lever and link so that as the lever and link are swung upwardly and downwardly the socket will be maintained vertically disposed in all positions, a locking link pivotally mounted upon said support having a slidable engagement with said lever, means for releasably holding the locking link and a lever against movement relatively to each other so as to hold the lever in adjusted position, a grill, suspending means connected to the grill, said suspending means being rotatably and removably receivable in the socket.

2. A barbecue comprising an upright support, a lever pivotally mounted upon said support for swinging movement relatively thereto about a horizontal axis, a link pivotally mounted upon the support in parallel relationship to the lever for swinging movement about a parallel axis, a vertically disposed socket pivotally mounted on the outer ends of the lever and link so that as the lever and link are swung upwardly and downwardly the socket will be maintained vertically disposed in all positions, a locking link pivotally mounted upon said support having a slidable engagement with said lever, means for releasably holding the locking link and lever against movement relatively to each other so as to hold the lever in adjusted position, said socket having an open side, a grill, suspending means connected to the grill and releasably locked rigid therewith for suspending the grill from the socket, said suspending means being receivable through the open side of the socket and having means thereon adapted to seat in the socket so that the suspending means and grill may be rotated relatively thereto but cannot be tilted relatively thereto while seated.

3. A barbecue comprising an upright support, a lever pivotally mounted upon said support for swinging movement relatively thereto about a horizontal axis, a link pivotally mounted upon the support in parallel relationship to the lever for swinging movement about a parallel axis, a vertically disposed socket pivotally mounted on the outer ends of the lever and link so that as the lever and link are swung upwardly and downwardly the socket will be maintained vertically disposed in all positions, a locking link pivotally mounted upon said support having a slidable engagement with said lever, means for releasably holding the locking link and lever against movement relatively to each other so as to hold the lever in adjusted position, said socket having an open side, a grill, suspending means connected to the grill and releasably locked rigid therewith for suspending the grill from the socket, said suspending means being receivable through the open side of the socket, said socket having upper and lower upwardly facing seats, said suspending means having upper and lower enlargements thereon adapted to rotatably seat on said seats whereby the grill and suspending means may rotate relatively to the socket and on lifting the grill and suspending means slightly the suspending means may be passed through the open side of the socket and the grill and suspending means removed from the socket and in all positions of adjustment of said lever the suspending means will be maintained by the socket in vertical position.

4. A barbecue comprising an upright support, a head rotatably mounted on top of said support, levers pivotally mounted upon said head for swinging movement about the same horizontal axis and disposed on opposite sides of said head, links disposed on opposite sides of said head in parallel relationship to the levers and pivotally mounted thereon for swinging movement about an axis which is parallel to the mentioned axis, a locking link pivotally mounted upon said head slidably engaging one of said levers, means for releasably holding the locking link against relative movement to the mentioned lever to lock the levers in adjusted position, a socket pivotally connected to the outer ends of said levers and to the outer ends of said links so as to be held thereby in the same vertical position in all positions of adjustment of said levers, a grill, and means releasably locked rigid with the grill rotatably and detachably mounting the grill in the socket.

5. A barbecue comprising an upright support, a head rotatably mounted on top of said support, levers pivotally mounted upon said head for swinging movement about the same horizontal axis and disposed on opposite sides of said head, links disposed on opposite sides of said head in parallel relationship to the levers and pivotally mounted thereon for swinging movement about an axis which is parallel to the mentioned axis, a locking link pivotally mounted upon said head slidably engaging one of said levers, means for releasably holding the locking link against relative movement to the mentioned lever to lock the levers in adjusted position, a socket pivotally connected to the outer ends of said levers and to the outer ends of said links so as to be held thereby in the same vertical position in all positions of adjustment of said levers, a grill, suspending means connected to the grill and releasably locked rigid therewith, said socket having an open side through which the suspending means is receivable and having upper and lower upwardly facing seats and enlargements on the connecting means rotatably receivable in said seats whereby the connecting means will be held by the socket in a vertical position in all positions of adjustment of said levers but may be rotated relatively thereto and may be removed from the socket.

References Cited in the file of this patent

UNITED STATES PATENTS

| | | |
|---|---|---|
| 307,755 | Evans | Nov. 11, 1884 |
| 735,356 | Fisher | Aug. 4, 1903 |
| 747,700 | Grimm | Dec. 22, 1903 |
| 758,015 | Miller | Apr. 19, 1904 |
| 764,730 | King | July 12, 1904 |
| 881,382 | Dodge | Mar. 10, 1908 |
| 980,501 | Doll | Jan. 3, 1911 |
| 1,311,302 | Turner et al. | July 29, 1919 |
| 1,452,640 | Hulick | Apr. 24, 1923 |
| 1,570,657 | White | Jan. 26, 1926 |
| 2,173,024 | Park | Sept. 12, 1939 |
| 2,352,613 | Bradbury | July 4, 1944 |
| 2,604,884 | Walker | July 29, 1952 |
| 2,629,315 | Schaar | Feb. 24, 1953 |
| 2,637,313 | White | May 5, 1933 |
| 2,679,243 | Lee | May 25, 1954 |
| 2,763,517 | Strand | Sept. 18, 1956 |

FOREIGN PATENTS

| | | |
|---|---|---|
| 20,196 | Great Britain | Oct. 22, 1903 |